April 23, 1974  D. O. HANSON  3,806,550
METHOD AND APPARATUS FOR SEPARATING AND CONCENTRATING
DIETHYL ETHER AND ETHYL MERCAPTAN FROM
A COMPOSITE STREAM THEREOF
Filed May 8, 1972
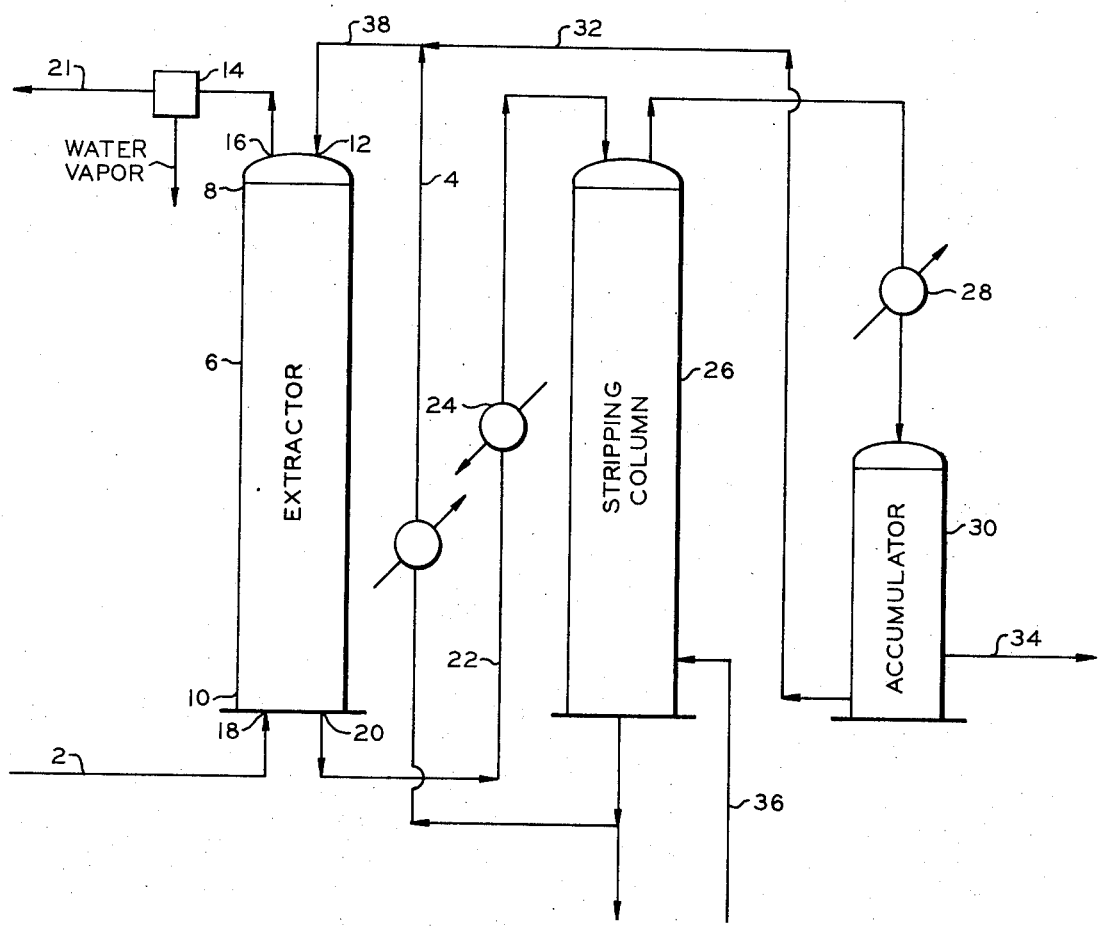

United States Patent Office 3,806,550
Patented Apr. 23, 1974

3,806,550
METHOD AND APPARATUS FOR SEPARATING AND CONCENTRATING DIETHYL ETHER AND ETHYL MERCAPTAN FROM A COMPOSITE STREAM THEREOF
Donald O. Hanson, Bartlesville, Okla., assignor to Phillips Petroleum Company
Filed May 8, 1972, Ser. No. 251,473
Int. Cl. C07c 149/02
U.S. Cl. 260—609 R   4 Claims

ABSTRACT OF THE DISCLOSURE

A method and apparatus for separating and concentrating diethyl ether and ethyl mercaptan from a composite stream thereof by countercurrently washing the composite stream with a water stream and separating a first major portion of the ethyl mercaptan from the composite stream and mixing substantially all the diethyl ether with the water stream for forming a second composite stream. The separated first major portion of the ethyl mercaptan is thereafter heated in a heating zone for removing water vapor thereof and increasing the concentration of said ethyl mercaptan.

It is desirable to provide apparatus and method for separating diethyl ether and ethyl mercaptan from a composite diethyl ether-ethyl mercaptan stream. The composite stream can be a byproduct stream resulting from the reaction of ethyl alcohol with hydrogen sulfide in processes for forming ethyl mercaptan, for example, or from other processes. The ethyl mercaptan is difficult and sometimes impossible to separate from diethyl ether by distillation methods owing to the close boiling points of the two components. The separation problem is made exceedingly difficult owing to the propensity of the components to form an azeotrope in some separation methods. Unless the separation is made, however, valuable products may be wasted. Further, valuable products may be wasted unless the components are effectively stripped of various other materials and concentrated to form components of high purity.

This invention therefore resides in apparatus and method for separating and concentrating diethyl ether and ethyl mercaptan from a composite stream thereof by countercurrently washing the composite stream with a water stream and separating a first major portion of the ethyl mercaptan from the composite stream and mixing substantially all of the diethyl ether with the water stream for forming a second composite stream. The separated first major portion of the ethyl mercaptan is thereafter heated in a heating zone for removing water vapor therefrom and increasing the concentration of said ethyl mercaptan.

Other aspects, objects, and advantages of the present invention will become apparent from a study of the disclosure, the appended claims, and the drawing.

The drawing is a diagrammatic view of the apparatus of this invention.

Referring to the drawing, a composite stream discharging from an ethyl mercaptan process plant, for example, passes through a diethyl etherethyl mercaptan composite stream conduit 2 and a water conduit 4 has a stream of water passing therethrough. An extractor vessel 6 has first and second ends 8, 10 with openings formed therethrough. The composite stream conduit 2 is connected to an inlet opening 18 positioned at the second end 10 of the extractor 6, a drier 14 is connected to an outlet opening 16 positioned at the first end 8 of the extractor 6, the water conduit 4 is connected to an inlet opening 12 positioned at the first end 6 of the extractor, and an outlet opening 20 is positioned on the second end 10 of the extractor 6.

In the extractor 6, the water stream countercurrently contacts the composite stream and separates a major portion of the ethyl mercaptan from said composite stream and dissolves substantially all of the diethyl ether from the mercaptan to form a second composite stream. The separated ethyl mercaptan portion passes into the drier 14 from the first end 8 of the extractor 6 and the second composite stream is discharged from the extractor 6 through outlet opening 20 of the second end 10 of the extractor 6.

In the drier 14, water is separated from the ethyl mercaptan stream by passage through an alumina or silica gel bed to obtain a product having a concentration in the range of about 99.5 to about 95.0 weight percent ethyl mercaptan. The concentrated ethyl mercaptan is thereafter removed from the drier 14 via line 21.

The second composite stream discharging from the second end 10 of the extractor 6 can be passed through conduit 22 to a heater 24 and thereafter into a stripping column 26 for removing water vapor from the composite stream and concentrating and vaporizing the diethyl ether and ethyl mercaptan. The diethyl ether and ethyl mercaptan vapors can thereafter be passed through a condenser 28 and the resulting diethyl ether-ethyl mercaptan condensate recovered in an accumulator 30. The composite fluid in the accumulator 30 can be further stripped of water with said separated water passing via line 32 to the inlet opening 12 of the first end 8 of the extractor 6 for recycle. The concentrated diethyl ether-ethyl mercaptan can be removed from the accumulator and preferably recycled to an ethyl mercaptan reactor for further processing.

In the apparatus and by the method of this invention, as can be seen in the example, high purity ethyl mercaptan can be easily and effectively separated from the composite feed stream and the resultant second composite feed stream can be concentrated, removed through line 34, and further utilized.

EXAMPLE

Material balance (basis 100 mols feed)

| Location | (2) | (21) | (34) | (36) | (38) |
|---|---|---|---|---|---|
| Component: | | | | | |
| Diethyl ether | 10 | .69 | 9.31 | | |
| Ethyl mercaptan | 90 | 68.31 | 21.69 | | |
| Water | | | | 67 | 3,351 |

| | Operating ranges | Preferred ranges |
|---|---|---|
| Water temperature extractor (6) | 0 ᵃ–100° F | Narrow 40–80° F. |
| Impurities in ethyl mercaptan | ½ to 5% | do ½ to 2%. |
| Stripping temperature | 350–250° F | do 300–250° F. |

ᵃ Freezing temperature lowered by added ingredients.

It has been found that at water temperatures outside the above ranges, the efficiency of the separation is lowered to values at which there is excessive waste resulting from not recovering ethyl mercaptans. At temperatures outside the above ranges, the second composite stream is not desirably concentrated for further processing which represents a waste of labor and equipment.

It should be understood that the sizes of equipment and power regulate the feed rates and flow rates of the various streams. In light of the above disclosure, one skilled in the art can immediately determine these variables.

Other modifications and alterations of this invention will become apparent to those skilled in the art from the foregoing discussion, example, and accompanying drawing, and it should be understood that this invention is not to be unduly limited thereto.

What is claimed is:

1. A method for separating and concentrating diethyl ether and ethyl mercaptan from a composite diethyl ether-ethyl mercaptan stream comprising:

countercurrently contacting the composite stream with a water stream in a vessel, said composite stream passing upwardly through the vessel and said water stream passing downwardly through the vessel, separating a first major portion of the ethyl mercaptan from the composite stream, and dissolving substantially all of the diethyl ether with the water stream to form a second composite stream;

passing the first major portion of ethyl mercaptan from an upper portion of the vessel into a drying zone;

removing water from the separated first major portion of the ethyl mercaptan in the drying zone and increasing the concentration of said ethyl mercaptan;

recovering the ethyl mercaptan from the drying zone; and recovering the second composite stream from a lower portion of the vessel.

2. A method, as set forth in claim 1, wherein the first major portion of the ethyl mercaptan recovered from the drying zone has a concentration in the range of about 99.5 to about 95.0 weight percent.

3. A method, as set forth in claim 1, wherein the water stream is maintained at a temperature in the range of about 40 to about 80° F.

4. A method, as set forth in claim 1, including heating the recovered second composite stream to a temperature sufficient for vaporizing the diethyl ether and the ethyl mercaptan;

recovering diethyl ether and ethyl mercaptan vapor;

condensing the diethyl ether and ethyl mercaptan vapors; and recovering said resultant condensate.

References Cited

UNITED STATES PATENTS 3,697,602  10/1972  Schleyer et al. ----- 260—609 R

FOREIGN PATENTS 2,012,271  3/1970  France ---------- 260—609 R

LEWIS GOTTS, Primary Examiner

D. R. PHILLIPS, Assistant Examiner

U.S. Cl. X.R.

202—176; 260—609 R